US011212085B2

(12) United States Patent
Verrall et al.

(10) Patent No.: US 11,212,085 B2
(45) Date of Patent: Dec. 28, 2021

(54) TECHNOLOGIES FOR ACCELERATED HIERARCHICAL KEY CACHING IN EDGE SYSTEMS

(71) Applicant: Intel Corporation, Santa Clara, CA (US)

(72) Inventors: Timothy Verrall, Pleasant Hill, CA (US); Thomas Willhalm, Sandhausen (DE); Francesc Guim Bernat, Barcelona (ES); Karthik Kumar, Chandler, AZ (US); Ned M. Smith, Beaverton, OR (US); Rajesh Poornachandran, Portland, OR (US); Kapil Sood, Portland, OR (US); Tarun Viswanathan, El Dorado Hills, CA (US); John J. Browne, Limerick (IE); Patrick Kutch, Tigard, OR (US)

(73) Assignee: Intel Corporation, Santa Clara, CA (US)

( * ) Notice: Subject to any disclaimer, the term of this patent is extended or adjusted under 35 U.S.C. 154(b) by 297 days.

(21) Appl. No.: 16/368,982

(22) Filed: Mar. 29, 2019

(65) Prior Publication Data
US 2019/0229897 A1 Jul. 25, 2019

(51) Int. Cl.
*H04L 9/08* (2006.01)

(52) U.S. Cl.
CPC ............ *H04L 9/083* (2013.01); *H04L 9/0836* (2013.01); *H04L 9/0891* (2013.01); *H04L 9/0894* (2013.01); *H04L 9/0897* (2013.01)

(58) Field of Classification Search
CPC ..... H04L 9/083; H04L 9/0836; H04L 9/0897; H04L 9/0891; H04L 9/0894
See application file for complete search history.

(56) References Cited

U.S. PATENT DOCUMENTS

| 10,244,071 B2 | 3/2019 | Moustafa et al. |
| 2016/0269179 A1* | 9/2016 | White ................... H04L 9/0897 |

(Continued)

OTHER PUBLICATIONS

A. Yousefpour et al., "All One Needs to Know about Fog Computing and Related Edge Computing Paradigms," Journal of Systems Architecture, Aug. 2018 (49 pages).

(Continued)

*Primary Examiner* — J. Brant Murphy
(74) *Attorney, Agent, or Firm* — Hanley, Flight & Zimmerman, LLC (57) ABSTRACT

Technologies for accelerated key caching in an edge hierarchy include multiple edge appliance devices organized in tiers. An edge appliance device receives a request for a key, such as a private key. The edge appliance device determines whether the key is included in a local key cache and, if not, requests the key from an edge appliance device included in an inner tier of the edge hierarchy. The edge appliance device may request the key from an edge appliance device included in a peer tier of the edge hierarchy. The edge appliance device may activate per-tenant accelerated logic to identify one or more keys in the key cache for eviction. The edge appliance device may activate per-tenant accelerated logic to identify one or more keys for pre-fetching. Those functions of the edge appliance device may be performed by an accelerator such as an FPGA. Other embodiments are described and claimed.

25 Claims, 7 Drawing Sheets

(56) References Cited

U.S. PATENT DOCUMENTS

| | | | |
|---|---|---|---|
| 2018/0041336 A1* | 2/2018 | Keshava | G06F 21/33 |
| 2018/0146041 A1* | 5/2018 | Moustafa | H04L 41/5025 |
| 2020/0084018 A1* | 3/2020 | Pande | H04L 9/0618 |
| 2020/0136822 A1* | 4/2020 | Villapakkam | H04L 63/061 |
| 2021/0012035 A1* | 1/2021 | Wei | G06F 21/78 |

OTHER PUBLICATIONS

Hong et al., "Resource Management in Fog/Edge Computing: A Survey," arXiv:1810.00305v1 [cs.DC] Sep. 30, 2018 (22 pages).

* cited by examiner

TECHNOLOGIES FOR ACCELERATED HIERARCHICAL KEY CACHING IN EDGE SYSTEMS

BACKGROUND

Certain cloud computing architectures may provide function as a service (FaaS) services. Typical FaaS systems allow a client to invoke a particular function on-demand, without executing a dedicated service process. Certain FaaS systems may use one or more private keys to protect data associated with the function, such as client private keys, tenant private keys, or other secret keys. The number or amount of users executing FaaS services may be unbounded.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. Furthermore, the disclosed embodiments may be initially encoded as a set of preliminary instructions (e.g., encoded on a machine-readable storage medium) that may require preliminary processing operations to prepare the instructions for execution on a destination device. The preliminary processing may include combining the instructions with data present on a device, translating the instructions to a different format, performing compression, decompression, encryption, and/or decryption, combining multiple files that include different sections of the instructions, integrating the instructions with other code present on a device, such as a library, an operating system, etc., or similar operations. The preliminary processing may be performed by the source compute device (e.g., the device that is to send the instructions), the destination compute device (e.g., the device that is to execute the instructions), or an intermediary device. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Figure 1:
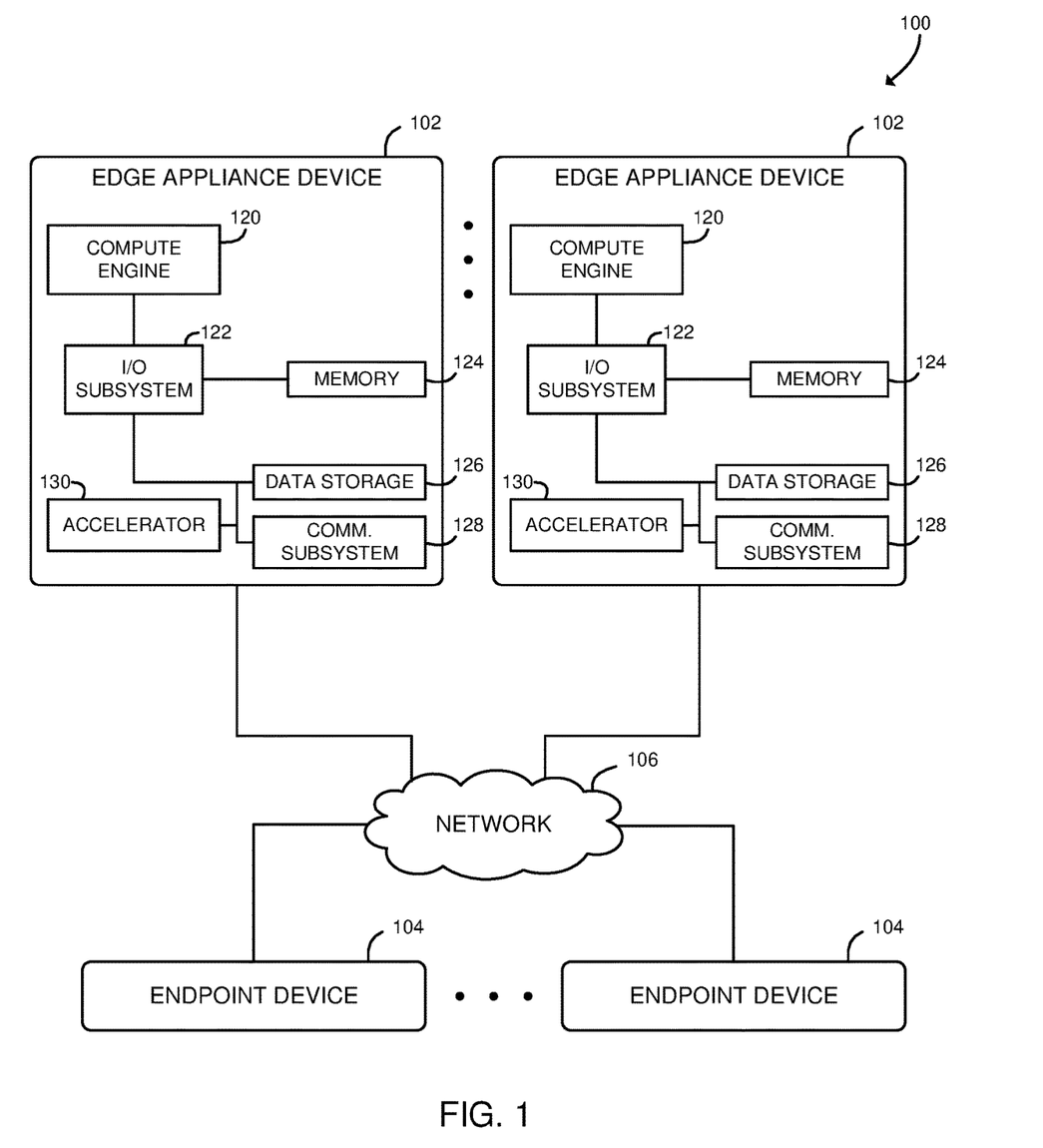
FIG. 1 is a simplified block diagram of at least one embodiment of a system for accelerated hierarchical key caching.

Referring now to FIG. 1, a system 100 for accelerated hierarchical key caching includes multiple edge appliance devices 102 and multiple endpoint devices 104. In use, as described further below, each appliance device 102 maintains a secure key cache. Users operating endpoint devices 104 access function as a service (FaaS) instances executed by the edge appliance devices 102. To access secure user and tenant data, the FaaS instances access the secure key cache using accelerated key management logic. The accelerated key management logic may request keys from inner tiers in the edge network hierarchy. The inner tiers may be more centralized and thus logically or physically more remote from the endpoint devices 104. Per-tenant accelerated logic may be executed to identify keys for eviction from the key cache. Per-tenant accelerated logic may be executed to identify keys for pre-fetching from other tiers of the edge hierarchy. The system 100 allows cached copies of keys (including private keys, secret keys, public keys, and other keys) to exist in various places within the network to facilitate faster key migration among FaaS tenant environments. By caching and/or pre-fetching keys in the edge appliance devices 102, the appropriate keys may be available to users of endpoint devices 104 with reduced latency as compared to accessing keys form a centralized server. Additionally, per-tenant cache replacement logic may allow for improved use of limited cache space in outer tiers of the edge architecture. Thus, the system 100 may speed up delivery of keys to an authenticated user of a service at the edge of the network.

Each edge appliance device 102 may be embodied as any type of device capable of performing the functions described herein. For example, the edge appliance device 102 may be embodied as, without limitation, a computer, a server, a workstation, a multiprocessor system, a distributed computing device, a switch, a router, a network device, a virtualized system (e.g., one or more functions executed in virtualized environment(s), such as virtual machine(s) or container(s), in which the underlying hardware resources appear as physical hardware to software executing in the virtualized environment(s), but are separated from the software by an abstraction layer), and/or a consumer electronic device. Additionally or alternatively, the edge appliance device 102 may be embodied as a one or more compute sleds, memory sleds, or other racks, sleds, computing chassis, or other components of a physically disaggregated computing device. As shown in FIG. 1, the illustrative edge appliance device 102 includes a compute engine 120, an I/O subsystem 122, a memory 124, a data storage device 126, and a communication subsystem 128. Additionally, in some embodiments, one or more of the illustrative components may be incorporated in, or otherwise form a portion of, another component. For example, the memory 124, or portions thereof, may be incorporated in the compute engine 120 in some embodiments.

The compute engine 120 may be embodied as any type of compute engine capable of performing the functions described herein. For example, the compute engine 120 may be embodied as a single or multi-core processor(s), digital signal processor, microcontroller, field-programmable gate array (FPGA), or other configurable circuitry, application-specific integrated circuit (ASIC), or other processor or processing/controlling circuit or virtualized version thereof. Similarly, the memory 124 may be embodied as any type of volatile or non-volatile memory or data storage capable of performing the functions described herein. In operation, the memory 124 may store various data and software used during operation of the edge appliance device 102 such as operating systems, applications, programs, libraries, and drivers. As shown, the memory 124 may be communicatively coupled to the compute engine 120 via the I/O subsystem 122, which may be embodied as circuitry and/or components to facilitate input/output operations with the compute engine 120, the memory 124, and other components of the edge appliance device 102. For example, the I/O subsystem 122 may be embodied as, or otherwise include, memory controller hubs, input/output control hubs, sensor hubs, host controllers, firmware devices, communication links (i.e., point-to-point links, bus links, wires, cables, light guides, printed circuit board traces, etc.) and/or other components and subsystems to facilitate the input/output operations. In some embodiments, the memory 124 may be directly coupled to the compute engine 120, for example via an integrated memory controller hub. Additionally, in some embodiments, the I/O subsystem 122 may form a portion of a system-on-a-chip (SoC) and be incorporated, along with the compute engine 120, the memory 124, the accelerator 130, and/or other components of the edge appliance device 102, on a single integrated circuit chip.

The data storage device 126 may be embodied as any type of device or devices configured for short-term or long-term storage of data such as, for example, memory devices and circuits, memory cards, hard disk drives, solid-state drives, non-volatile flash memory, or other data storage devices. The communications subsystem 128 may be embodied as any communication circuit, device, or collection thereof, capable of enabling communications between the edge appliance device 102 and other remote devices over the network 106. The communications subsystem 128 may be configured to use any one or more communication technology (e.g., wired or wireless communications) and associated protocols (e.g., Ethernet, Bluetooth®, Wi-Fi®, WiMAX, 3G, 4G LTE, 5G, etc.) to effect such communication.

The accelerator 130 may be embodied as a field-programmable gate array (FPGA), an application-specific integrated circuit (ASIC), a coprocessor, or other digital logic device capable of performing accelerated functions (e.g., accelerated application functions, accelerated network functions, or other accelerated functions). Illustratively, the accelerator 130 is an FPGA, which may be embodied as an integrated circuit including programmable digital logic resources that may be configured after manufacture. The FPGA may include, for example, a configurable array of logic blocks in communication over a configurable data interchange. The accelerator 130 may be coupled to the compute engine 120 via a high-speed connection interface such as a peripheral bus (e.g., a PCI Express bus) or an inter-processor interconnect (e.g., an in-die interconnect (IDI) or QuickPath Interconect (QPI)), or via any other appropriate interconnect. In some embodiments, the accelerator 130 may be incorporated in or otherwise coupled with one or more other components of the edge appliance device 102, such as a network interface controller (NIC) of the communication subsystem 128.

Each endpoint device 104 may be embodied as any type of computation or computer device capable of performing the functions described herein, including, without limitation, a computer, a mobile computing device, a wearable computing device, a network appliance, a web appliance, a distributed computing system, an autonomous vehicle, an autonomous aerial vehicle, an Internet of Things (IoT) sensor, an IoT gateway, an industrial automation device, a processor-based system, and/or a consumer electronic device. As such, each endpoint device 104 may include components and features similar to the edge appliance device 102, such as a compute engine 120, I/O subsystem 122, memory 124, data storage 126, communication subsystem 128, and/or various peripheral devices. Those individual components of each endpoint device 104 may be similar to the corresponding components of the edge appliance device 102, the description of which is applicable to the corresponding components of the endpoint device 104 and is not repeated for clarity of the present description.

As discussed in more detail below, the edge appliance devices 102 and the endpoint devices 104 may be configured to transmit and receive data with each other and/or other devices of the system 100 over the network 106. The network 106 may be embodied as any number of various wired and/or wireless networks, or hybrids or combinations thereof. For example, the network 106 may be embodied as, or otherwise include a mobile access network, a network edge infrastructure, a wired or wireless local area network (LAN), and/or a wired or wireless wide area network (WAN). As such, the network 106 may include any number of additional devices, such as additional base stations, access points, computers, routers, and switches, to facilitate communications among the devices of the system 100. In the illustrative embodiment, the network 106 is embodied as an edge network fabric.

Figure 2:
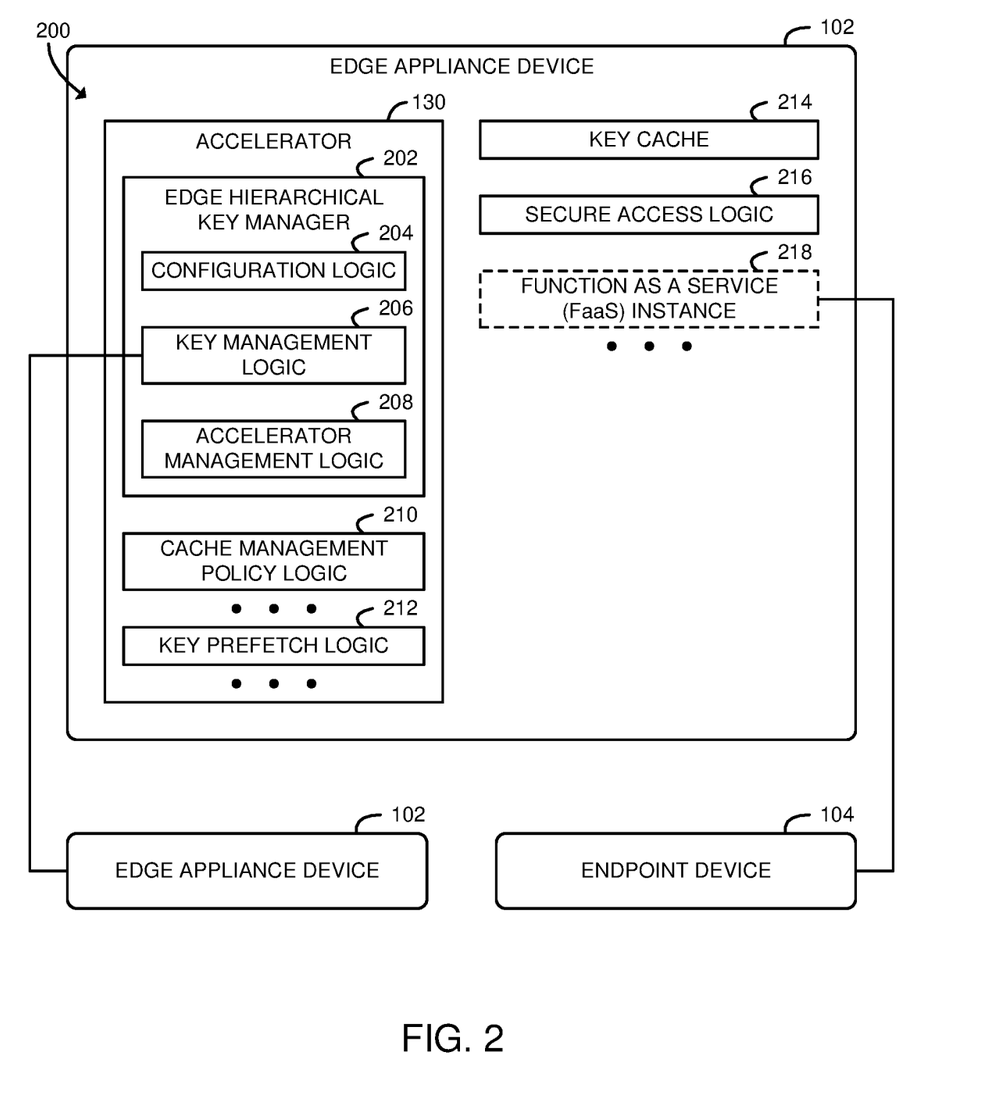
FIG. 2 is a simplified block diagram of at least one embodiment of various environments of the system of FIG. 1.

Referring now to FIG. 2, in an illustrative embodiment, each edge appliance device 102 establishes an environment 200 during operation. The illustrative environment 200 includes the accelerator 130, a key cache 214, secure access logic 216, and in some embodiments a function as a service (FaaS) instance 218. The accelerator 130 includes an edge hierarchical key manager 202 and may include one or more cache management policy logic 210 and/or key prefetch logic 212. The various components of the environment 200 may be embodied as hardware, firmware, software, or a combination thereof. As such, in some embodiments, one or more of the components of the environment 200 may be embodied as circuitry or collection of electrical devices (e.g., key manager circuitry 202, cache management policy logic circuitry 210, key prefetch logic circuitry 212, key cache security 214, secure access logic security 216, and/or FaaS instance circuitry 218). It should be appreciated that, in such embodiments, one or more of the key manager circuitry 202, cache management policy logic circuitry 210, key prefetch logic circuitry 212, key cache security 214, secure access logic security 216, and/or FaaS instance circuitry 218 may form a portion of the compute engine 120, the I/O subsystem 122, the accelerator 130, and/or other components of the edge appliance device 102. Additionally, in some embodiments, one or more of the illustrative components may form a portion of another component and/or one or more of the illustrative components may be independent of one another.

As shown, the key manager 206 includes one or more sub-components, including a configuration logic 204, a key management logic 206, and/or an accelerator management logic 208. The configuration logic 204 is configured to communicate with an orchestrator or other administrative entity via a management interface of the edge appliance device 102. The configuration logic 204 may be configured to receive pre-provisioned private keys. The configuration logic 204 may be further configured to receive a priority level associated with each tenant via the management interface and to configure the key cache 214 based on the priority level associated with the tenant. In some embodiments the configuration logic 204 may establish one or more out of band interfaces that may only be accessed by an orchestration stack of the system 100.

The accelerator management logic 208 is configured to receive one or more cache management policy accelerated logic 210 via the management interface and to program the accelerator 130 with the cache management policy accelerated logic 210. The accelerator management logic 208 is further configured to receive one or more key prefetch accelerated logic 212 via the management interface and to program the accelerator 130 with the key prefetch accelerated logic 212.

The key management logic 206 is configured to receive requests for keys, such as private keys, public keys, secret symmetric keys, or other keys. Each request is associated with a tenant of the edge appliance device 102. The request is indicative of a key identifier provided by a function-as-a-service (FaaS) instance 218 associated with an endpoint device 104. The request may be received from a FaaS instance 218 instantiated by the edge appliance device 102 or from a remote edge appliance device 102, as described further below. In some embodiments, the request is indicative of the credential provided by the FaaS instance 218, and the key management logic 206 is configured to authenticate the credential.

The key management logic 206 is further configured to determine whether the requested key is included in the key cache 214 and, if not, to request the key from a remote edge appliance device 102. The remote edge application device 102 is included in a next tier of the edge hierarchy that is logically more remote from the endpoint device 104. In some embodiments, the edge application device 102 may also request the key from one or more edge appliance devices 102 in the same, peer tier. The key management logic 206 is further configured to receive the requested key from a remote edge appliance device 102 and store the received key in the key cache 214. The key management logic 206 is further configured to provide the requested key as a response to the request, for example as a response to the FaaS instance 218 or to a requesting edge appliance device 102.

The key management logic 206 is further configured determine whether the key cache 214 is full in response to determining that the requested key is not stored in the key cache and to activate a cache management policy accelerated logic 210 if the key cache 214 is full. The cache management policy accelerated logic 210 is associated with the tenant. The key management logic 206 is further configured to evict one or more keys identified by the cache management policy accelerated logic 210 from the key cache 214.

The key management logic 206 is further configured to activate a key prefetch accelerated logic 212 that is associated with the tenant. The key management logic 206 is further configured to request a key from a remote edge appliance device 102 in response to identification of the key for pre-fetching by the key prefetch accelerated logic 212. The key management logic 206 is configured to wait a predetermined time associated with the tenant between activations of the key prefetch accelerated logic 212.

The cache management policy logic may be embodied as an application functional unit (AFU), kernel, bitstream, or other programmable, accelerated logic of the accelerator 130. The cache management policy logic 210 is configured to identify one or more keys in the key cache 214 for eviction in response to being activated. Similarly, the key prefetch logic 212 may be embodied as an application functional unit (AFU), kernel, bitstream, or other programmable, accelerated logic of the accelerator 130. The key prefetch logic 212 is configured to identify one or more keys for pre-fetching in response to activation. As shown, the environment 200 may include multiple cache management policy logics 210 and/or key prefetch logics 212. For example, each tenant may provide a cache management policy logic 210 and/or a key prefetch logic 212.

The key cache 214 is included in secure storage of the edge appliance device 102. The key cache 214 is configured to securely store keys for tenants of the edge appliance device 102, organized by tenant. For example, particular keys in the key cache 214 may not be accessible in-band by the compute engine 120, and may only be accessed by a FaaS instance 218 being executed by a particular tenant (with proper credentials). In some embodiments, the key cache 214 may be embodied as or otherwise stored with a local hardware security module (HSM), Intel® Software Guard Extensions (SGX) secure enclave, or other secure storage. Additionally or alternatively, in some embodiments the key cache 214 may cache key status rather than the encryption keys directly, and edge infrastructure may be used to maintain fresh key status. An orchestrator may determine which edge device(s) 104 are needed per workload and provision keys as necessary based on an understanding of key status.

The secure access logic 216 is configured to use the keys to perform secure access to encrypted memory, storage, or other resources of the edge application device 102. For example, the secure access logic 216 may provide the keys to a memory controller, a compute element, or other hardware component of the edge appliance device 102. As described above, each FaaS instance 218 may request a user private key, tenant private key, or other secret key to process a request or other operation for an endpoint device 104. The FaaS instance 218 (executed by a particular tenant) may securely access tenant data, user data, or other application data using the keys via the secure access logic 216.

Figure 3:
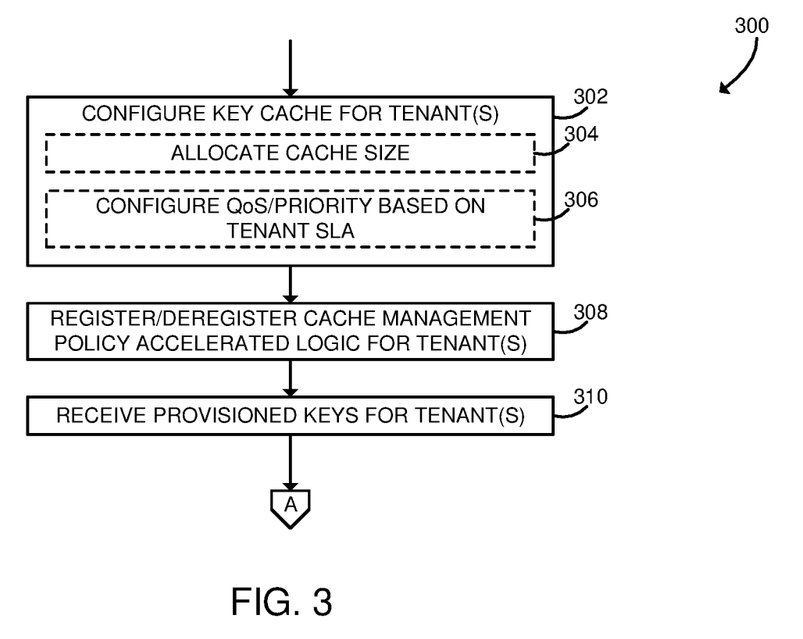
FIGS. 3 and 4 are a simplified flow diagram of at least one embodiment of a method for key cache management and access that may be executed by an edge appliance device of FIGS. 1-2.
Figure 4:
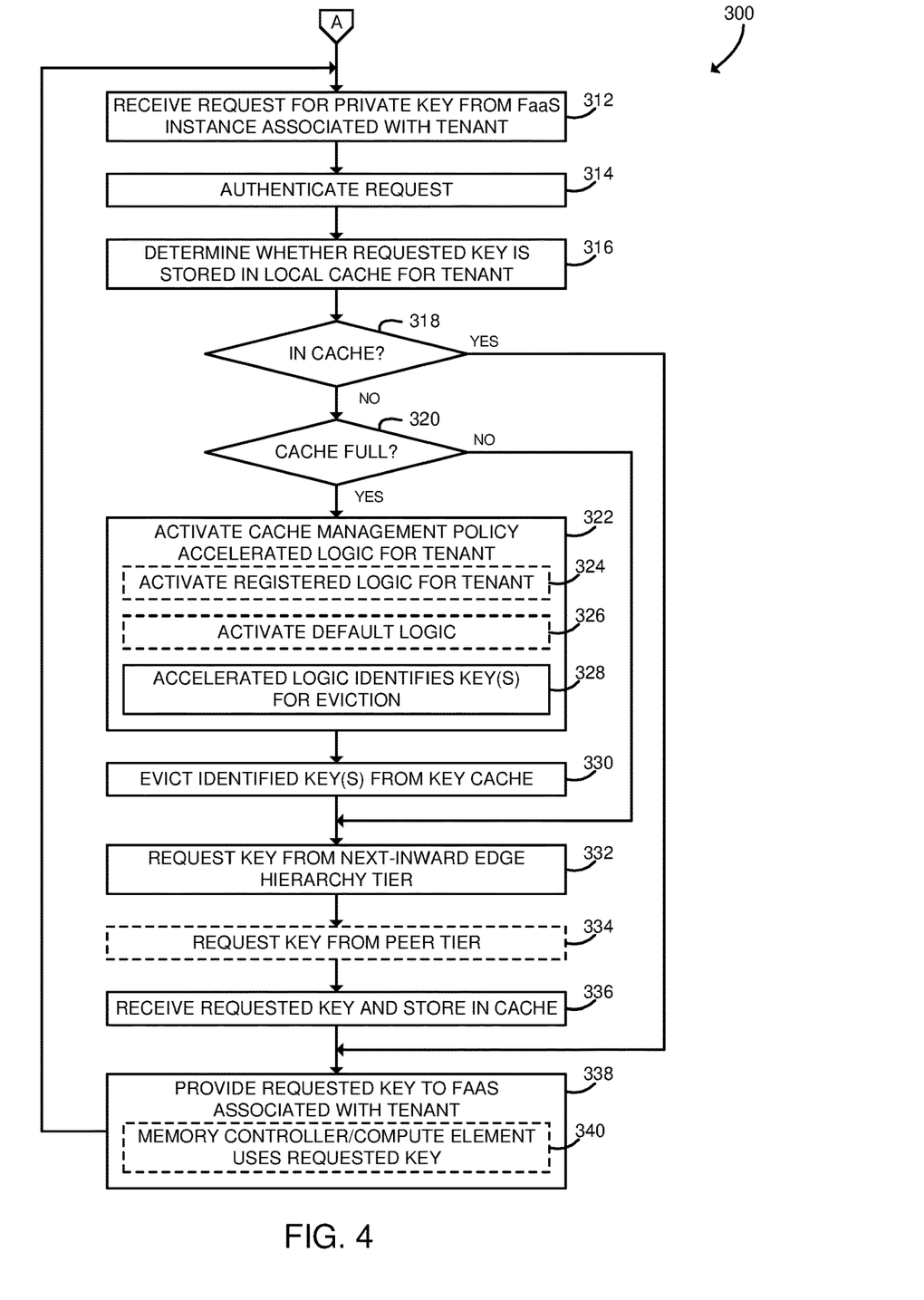

Referring now to FIGS. 3 and 4, in use, the edge appliance device 102 may execute a method 300 for key cache management and access. It should be appreciated that, in some embodiments, the operations of the method 300 may be performed by one or more components of the environment 200 of the edge appliance device 102 as shown in FIG. 2, such as the accelerator 130. The method 300 begins in block 302, in which the edge appliance device 102 configures the key cache 214 for one or more tenants of the edge application device 102. Each tenant may be embodied as an owner, operator, provider, or other entity that executes one or more FaaS instances 218 on the edge appliance device 102. In some embodiments, in block 304 the edge appliance device 102 may allocate part or all of the key cache 214 for each tenant. For example, the edge appliance device 102 may allocate more data in the key cache 214 for tenants that require improved performance. In some embodiments, in block 306 the edge appliance device 102 may configure quality of service (QoS) or priority based on a service level agreement (SLA) associated with each tenant. Each tenant may have different associated priorities or SLA. This would allow to the operator to provide different QoS or SLA mechanisms with respect to key access. For example, the edge appliance device 102 may provide certain key access guarantees for high real time or critical services. The SLA may be received via an out of band management interface, for example from a system orchestrator or other management entity.

In block 308, the edge appliance device 102 may register or deregister cache management policy accelerated logic 210 for each tenant. The cache management policy accelerated logic 210 may be embodied as bitstream or other data that may be programmed to the accelerator 130. The cache management policy accelerated logic 210 may be received via an out of band management interface, for example from a system orchestrator or other management entity. After being received, the edge appliance device 102 may program the accelerator 130 or store the cache management policy accelerated logic 210 for later programming. For example, the accelerator 130 may be partially reconfigured with the cache management policy accelerated logic 210 as an application functional unit (AFU) or other accelerated component.

In block 310, the edge appliance device 102 may receive one or more pre-provisioned keys. The pre-provisioned keys may be received via an out of band management interface, for example from a system orchestrator or other management entity. The pre-provisioned keys may be transmitted securely to prevent unauthorized disclosure, for example via an encrypted communication channel. The pre-provisioned keys may be embodied as, for example, private keys associated with one or more tenants or users (e.g., users of the FaaS instances 218), public keys (e.g., signing keys) associated with one or more tenants or users, or other keys. The pre-provisioned keys may be stored in the key cache 214 for later use, as described further below.

In some embodiments, a clustered approach may be used for key caching at the edge. The "locality" of the user to the service (e.g., cell station, home IP, etc.), and/or the type of service can be given a "setup speed SLA," which is used to define a life and location for the local key caching (or key state tracking) in an edge cluster. The cache location may be calculated from the required latency mapped to the measured latencies of the topology. The cluster may be, for example, a cell tracking area, a 4G/5G aggregation gateway, a broadband/cable aggregation gateway, or a combination of those clusters. The usage of the service may tracked by an orchestration service, and keys may be pushed in advance of requests to a secure "enclave" closer to the user, such as a cell station. The enclave may maintain the keys based on the per-service setup speed SLA. By securing the key in a local HSM/SGX secure enclave closer to the user, combined with assigning per-service access and location restrictions as well as key life span limits, with an ad-hoc cluster attack surface on the keys may be limited. Key Access Telemetry may be used to detect malicious attempts, by providing access patterns and usage back to the security orchestration system. The Security management system may trigger changes to authentication and change the SLA to enforce centralized key retrieval if required. After receiving any pre-provisioned keys, the edge appliance device 102 proceeds to block 312, shown in FIG. 4, to wait for requests to access the private keys.

In block 312, shown in FIG. 4, the edge appliance device 102 receives a request to access a key that originates from a FaaS instance 218. The request may be generated, for example, to perform an operation requested by the FaaS instance 218, by the associated endpoint device 104, and/or by a user of the associated endpoint device 104. The request identifies the key (e.g., by including a key name, key ID, or other identifier). The key may be embodied as, for example, a user or tenant private key for asymmetric key cryptography, a shared secret key for symmetric key cryptography, or other secret key. In some embodiments, the key may be embodied as a public key for asymmetric key cryptography, for example a public key that may be used to verify signatures generated by the endpoint device 104. The edge appliance device 102 may also receive a credential or other authentication method from the FaaS instance 218. The credential may be included in the request or provided separately.

In block 314, the edge appliance device 102 authenticates the request. The edge appliance device 102 may, for example, authenticate the credential or other authentication method provided by the FaaS 218. In some embodiments, the edge appliance device 102 may use SGX attestation as the basic security authentication technique. Separation of multiple tenants may also be provided by SGX, allowing tenants to securely own and manage their key hierarchy. If the request is not successfully authenticated, the edge appliance device 102 may indicate an error or otherwise halt processing the request. If the request is successful authenticated, the method 300 proceeds to block 316.

In block 316, the edge appliance device 102 determines whether the requested key is stored in the key cache 214 for the associated tenant. The edge appliance device 102 may, for example, search part of the key cache 214 that is allocated to the tenant associated with the requesting FaaS instance 218. In block 318, the computing device checks whether the requested key is stored in the local key cache 214. If the requested key is stored in the key cache 214, the method 300 branches to block 338, described below. If the requested key is not stored in the key cache 214, the method 300 advances to block 320.

In block 320, the edge appliance device 102 determines whether the key cache 214 is full for the current tenant. That is, the edge appliance device 102 may determine whether any keys must be evicted from the key cache 214 in order to store the requested key. If the key cache 214 is not full (i.e., eviction is not required), the method 300 branches to block 332, described below. If the key cache 214 is full (i.e., eviction is required), the method 300 advances to block 322.

In block 322, the edge appliance device 102 activates the cache management policy logic 210 associated with the current tenant. As described above, the edge appliance device 102 may program the cache management policy logic 210 to the accelerator 130 or otherwise prepare the cache management policy logic 210 for operation. In some embodiments, in block 324 the edge appliance device 102 may activate cache management policy logic 210 that was previously registered by the current tenant, as described above in connection with block 308. In some embodiments, in block 326 the edge appliance device 102 may activate a default cache management logic. For example, the edge appliance device 102 may activate the default logic if no logic was registered for the current tenant. In block 328, during operation, the cache management policy logic 210 identifies one or more victims (i.e., keys) in the key cache 214 for eviction. The cache management logic 210 may use any appropriate cache replacement policy, and as described above, the particular policy in use may be supplied by the tenant. The key eviction policy may know, for example, what keys are currently stored in the key cache 214 for the current tenant (e.g., key IDs) and how they are used. To avoid potential security threats, the cache management logic 210 may not have access to the actual keys included in the key cache 214 (e.g., the cache management logic 210 may not read or modify the keys).

In block 330, the edge appliance device 102 securely evicts the identified victim keys from the key cache 214. The edge appliance device 102 may, for example, activate an eviction interface of the key cache 214 with the identified victim keys. Evicting the keys allows additional keys to be stored in the key cache 214. When the keys leave the cache, the keys may be secured so that no other entity may read the keys. After evicting the keys, the method 300 advances to block 332.

In block 332, the edge appliance device 102 requests the requested key from another edge appliance device 102 in the next, inner tier of the edge network hierarchy. The next tier is more remote, logically, from the endpoint devices 104 as compared to the edge appliance device 102. For example, if the current edge appliance device 102 is located in a cell tower or base station, the edge appliance device 102 may request the key from an edge appliance device 102 in a central office or other more centralized location. The key request may be sent via a management interface or other out-of-band link between the edge appliance devices 102.

In some embodiments, in block 334 the edge appliance device 102 requests the requested key from another edge appliance device 102 in the same, peer tier of the edge network hierarchy as the edge appliance device 102. For example, if the current edge appliance device 102 is located in a cell tower or base station, the edge appliance device 102 may request the key from an edge appliance device 102 located in an adjacent cell tower or base station. The key may be requested speculatively; that is, the remote edge appliance device 102 also may not have the requested key stored. Edge appliance devices 102 located in such peer tiers may be accessed with lower latency as compared to central offices or other more centralized, inner tiers and thus may return the requested key more quickly than the inner tier. The particular remote edge appliance devices 102 that are contacted may be preconfigured, for example by a network orchestrator or other administrative entity.

In block 336, the edge appliance device 102 receives the requested key and stores the received key in the key cache 214. The key may be received from a remote edge appliance device 102 in a more-centralized, inner tier of the edge hierarchy or from the same tier, as described above. The key may be encrypted or otherwise protected during transmission from the remote edge appliance device 102. The key may be stored in a per-tenant reserved part of the key cache 214 or otherwise stored per-tenant in the key cache 214.

In block 338, the edge appliance device 102 provides the requested key to the requesting FaaS instance 218. The FaaS instance 218 may use the key to securely access encrypted data, for example data associated with a particular tenant or a particular user. For example, the key may be a private key that is the secret part of an asymmetric key pair and may be used to secure user or tenant data. As another example, the key may be a shared secret key, session key, or secret key used with symmetric key cryptography to secure user or tenant data. In some embodiments, the key may be a public key for asymmetric key cryptography. In those embodiments, the endpoint device 104 may retain the private key and use the private key to sign data, and the FaaS instance 218 may use the requested public key to verify signatures generated by the endpoint device 104. The requested key may be provided to the FaaS instance 218 securely in order to prevent unauthorized disclosure. In some embodiments, in block 340 a memory controller, compute element, or other hardware component of the edge appliance device 102 may use the requested key to provide access to the encrypted data. For example, the requested key may be supplied to the memory controller in order to access encrypted memory transparently to the FaaS instance 218. Thus, in those embodiments, the key may not be directly revealed to the FaaS instance 218. After providing the requested key, the method 300 loops back to block 312 to process additional key requests.

Figure 5:
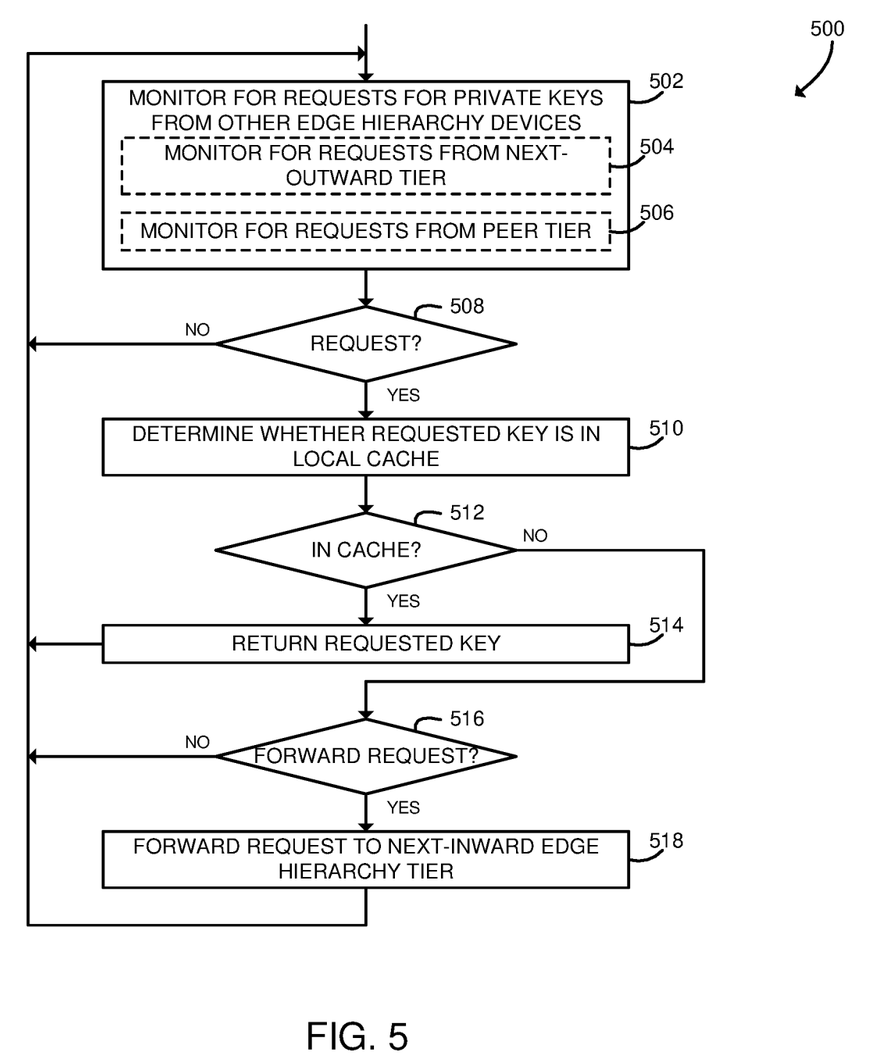
FIG. 5 is a simplified flow diagram of at least one embodiment of a method for key request processing that may be executed by an edge appliance device of FIGS. 1-2.

Referring now to FIG. 5, in use, the edge appliance device 102 may execute a method 500 for key request processing. It should be appreciated that, in some embodiments, the operations of the method 500 may be performed by one or more components of the environment 200 of the edge appliance device 102 as shown in FIG. 2, such as the accelerator 130. The method 500 begins in block 502, in which the edge appliance device 102 monitors for requests for keys from other edge appliance devices 102. The key request may be received via a management interface or other out-of-band link between the edge appliance devices 102. The request may indicate the particular requested key and an associated tenant. In block 504, the edge appliance device 102 may monitor for requests received from the next outer tier of the edge network hierarchy that that is less remote, logically, from the endpoint devices 104 as compared to the edge appliance device 102. For example, if the current edge appliance device 102 is located in a central office, the edge appliance device 102 may monitor for requests from edge appliance devices 102 in cell towers or base stations. In some embodiments, in block 506 the edge appliance device 102 may monitor for requests received from the same tier of the edge network hierarchy. For example, if the current edge appliance device 102 is located in a central office, the edge appliance device 102 may monitor for requests from other devices located in central offices.

In block 508, the edge appliance device 102 determines whether a request has been received. If not, the method 500 loops back to block 502 to continue monitoring for requests. If a request is received, the method 500 advances to block 510. In block 510, the edge appliance device 102 determines whether the requested key is stored in the key cache 214 for the associated tenant. As described above, the edge appliance device 102 may, for example, search part of the key cache 214 that is allocated to the requesting tenant. In block 512, the computing device checks whether the requested key is stored in the local key cache 214. If the requested key is not stored in the key cache 214, the method 500 branches to block 516, described below. If the requested key is stored in the key cache 214, the method 500 branches to block 514. In block 514, the edge appliance device 102 returns the requested key to the requesting edge appliance device 102. The keys may be returned to the requesting edge appliance device 102 securely to prevent unauthorized disclosure, for example via an encrypted communication channel. As described above, the requesting edge appliance device 102 may provide the key to a requesting FaaS instance 218 or otherwise use the key. After providing the key, the method 500 loops back to block 502 to continue monitoring for requests.

Referring back to block 512, if the requested key is not in the key cache 214, the method 500 branches to block 516, in which the edge appliance device 102 determines whether to request the key from a more-centralized tier of the edge hierarchy. For example, if the request was received from an outer, less-centralized tier (e.g., from a tier that is logically closer to the endpoint devices 104), then the edge appliance device 102 may propagate the request inward toward more-centralized tiers. As another example, if the request was received from a peer tier, then the request may be speculative and there may be no need to propagate the request. If the edge appliance device 102 determines not to request the key, the method 500 loops back to block 502 to continue monitoring for requests. If the edge appliance device 102 determines to request the key the method 500 advances to block 516.

In block 516, the edge appliance device 102 requests the requested key from another edge appliance device 102 in the next inner tier of the edge network hierarchy that that is more remote, logically, from the endpoint devices 104 as compared to the edge appliance device 102. For example, if the current edge appliance device 102 is located in a central office, the edge appliance device 102 may request the key from an edge appliance device 102 in a core network or other more centralized location. As described above, the key request may be sent via a management interface or other out-of-band link between the edge appliance devices 102. The edge appliance device 102 may receive the key and store the key in the key cache 214 as described above. After forwarding the request and processing any response, the method 500 oops back to block 502 to continue monitoring for requests.

Figure 6:
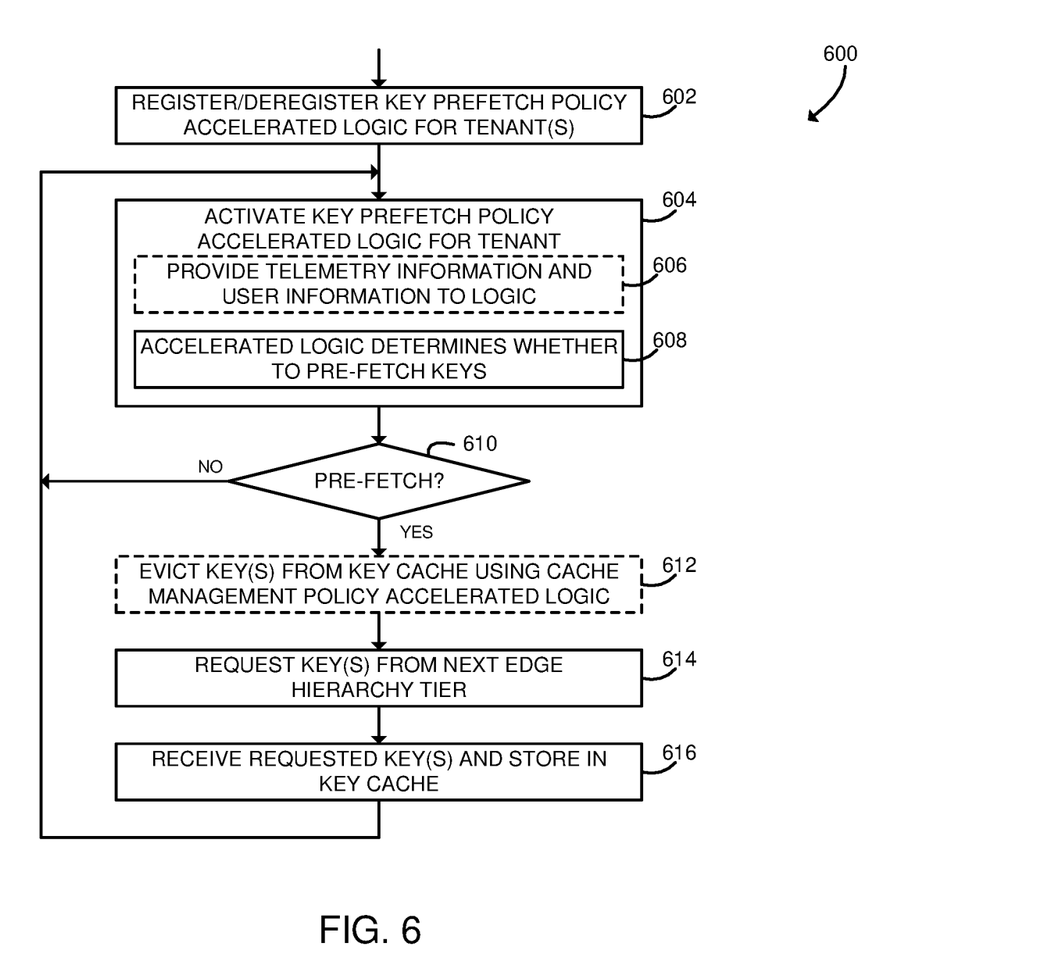
FIG. 6 is a simplified flow diagram of at least one embodiment of a method for key request pre-fetching that may be executed by an edge appliance device of FIGS. 1-2.

Referring now to FIG. 6, in use, the edge appliance device 102 may execute a method 600 for key request pre-fetching. It should be appreciated that, in some embodiments, the operations of the method 600 may be performed by one or more components of the environment 200 of the edge appliance device 102 as shown in FIG. 2, such as the accelerator 130. The method 600 begins in block 602, in which the edge appliance device 102 registers or deregisters key prefetch accelerated logic 212 for each tenant. The key prefetch accelerated logic 212 may be embodied as bitstream or other data that may be programmed to the accelerator 130. The key prefetch accelerated logic 212 may be received via an out of band management interface, for example from a system orchestrator or other management entity. After being received, the edge appliance device 102 may program the accelerator 130 or store the key prefetch accelerated logic 212 for later programming. For example, the accelerator 130 may be partially reconfigured with the key prefetch accelerated logic 212 as an application functional unit (AFU) or other accelerated component.

In block 604, the edge appliance device 102 activates the key prefetch accelerated logic 212 associated with the current tenant. As described above, the edge appliance device 102 may program the key prefetch accelerated logic 212 to the accelerator 130 or otherwise prepare the key prefetch accelerated logic 212 for operation. In block 606, the edge appliance device 102 provides telemetry data to the key prefetch acceleration logic 212 as input. The telemetry data may identify hardware information, performance utilization, network utilization, or other information related to the edge appliance device 102 and potentially resources associated to a particular owner ID or list of ranges. In some embodiments, the telemetry data may also include user information, for example information on which FaaS and users from that particular tenant have been or are being executed on the edge appliance device 102.

In block 608, during operation, the key prefetch accelerated logic 212 determines whether to pre-fetch keys. The key prefetch accelerated logic 212 may identify particular keys for prefetching (e.g., key names or key IDs) and/or particular remote edge appliance devices 102 from which to request the keys. The key prefetch accelerated logic 212 may identify the keys and/or remote edge appliance devices 102 based on the telemetry data provided by the edge appliance device 102. For example, the key prefetch accelerated logic 212 may identify keys that need to be brought from the next tier and that are very likely to be used in the near future. For example, if the tenant knows that a particular FaaS instance 218a is being executed or used by a particular user, the key prefetch accelerated logic 212 may determine that it is very likely that another FaaS instance 218b may be executed by a particular user, and thus the associated key should be pre-fetched. To avoid potential security threats, the key prefetch accelerated logic 212 may not have access to the actual keys included in the key cache 214 (e.g., the key prefetch accelerated logic 212 may not read or modify the keys).

In block 610, the edge appliance device 102 determines whether to pre-fetch any keys based on the output of the key prefetch accelerated logic 212. If not, the method 600 loops back to block 604 to continue activating the key prefetch accelerated logic 212. In some embodiments, the edge appliance device 102 may periodically activate the key prefetch accelerated logic 212, for example by waiting a predetermined amount of time between activations. The particular frequency of activation or wait time may depend on the particular tenant.

Referring back to block 610, if the edge appliance device 102 determines to pre-fetch keys, the method 600 advances to block 612. In block 612, the edge appliance device 102 may evict one or more keys from the key cache 214 using the cache management policy accelerated logic 210, as described above in connection with FIG. 3.

In block 614, the edge appliance device 102 requests one or more identified keys for pre-fetching from another edge appliance device 102 in a different tier of the edge network hierarchy. The edge appliance device 102 may request the keys from an inner, more-centralized tier; that is, a tier that is more remote, logically, from the endpoint devices 104 as compared to the edge appliance device 102. In some embodiments, the edge appliance device 102 may request the keys from an outer, less-centralized tier; that is, a tier that is less remote, logically, from the endpoint devices 104. The key request may be sent via a management interface or other out-of-band link between the edge appliance devices 102.

In block 616, the edge appliance device 102 receives the requested keys and stores them in the key cache 214 as described above. After being stored in the key cache 214, the key may be used by the edge appliance device 102. For example, the key may be available for use by FaaS instances 218 of the edge appliance device 102 as described above. After storing the requested keys, the method 600 loops back to block 604 to continue activating the key prefetch accelerated logic 212. As described above, in some embodiments, the edge appliance device 102 may periodically activate the key prefetch accelerated logic 212, for example by waiting a predetermined amount of time between activations. The particular activation frequency or wait time may depend on the particular tenant.

Figure 7:
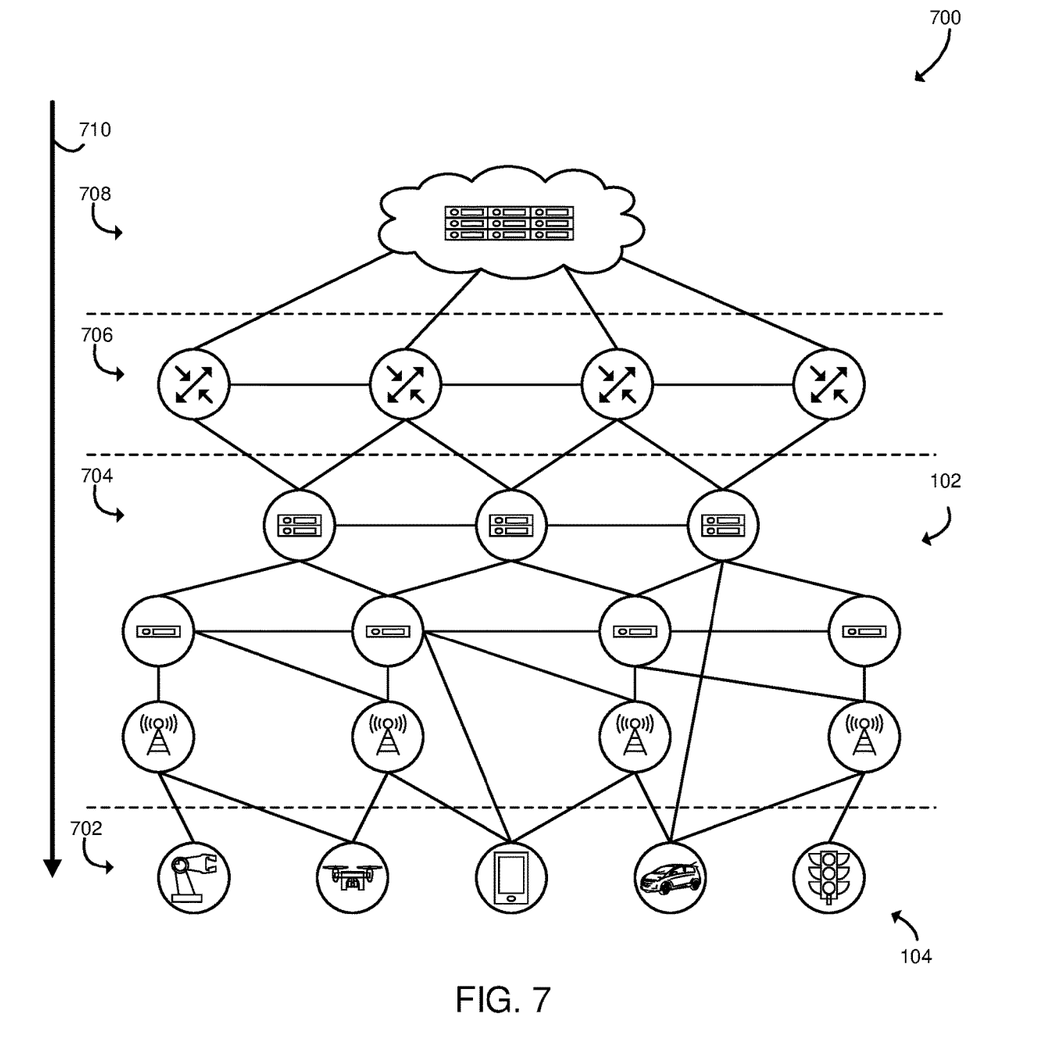
FIG. 7 is a simplified block diagram of at least one embodiment of an edge architecture that may include the system of FIGS. 1-2.

Referring now to FIG. 7, diagram 700 shows an edge architecture that may include the system 100. As shown, the edge architecture includes multiple tiers 702, 704, 706, 708. Each tier includes multiple nodes that may communicate via an edge fabric to other nodes of the same tier and/or nodes at other tiers. As shown, the endpoint devices 104 may be included in the things/endpoint tier 702. The things/endpoint tier 702 may include large numbers of endpoint devices 104 that are heterogeneous, may be mobile, and are widely distributed geographically. The access/edge tier 704 may include access network components such as wireless towers, access points, base stations, intermediate nodes, gateways, fog nodes, central offices, and other access network or edge components. Components of the access/edge tier 704 may be distributed at the building, small cell, neighborhood, or cell scale. Thus, components of the access/edge tier 704 may be relatively close in physical proximity to components of the things/endpoint tier 702. The core network tier 706 may include core network routers, network gateways, servers, and other more-centralized computing devices. Components of the core network tier 706 may be distributed regionally or nationally. The cloud/Internet tier 708 may include Internet backbone routers, cloud service providers, datacenters, and other cloud resources. The components of the cloud/Internet tier 708 may be distributed globally. As shown, the edge appliance devices 102 may be included in all of the access/edge tier 704, the core network tier 706, and/or the cloud/Internet tier 708.

As shown, the edge architecture is organized according to a logical gradient 710 from global, cloud-based components toward local, endpoint devices. Components that are closer to the network edge (i.e., closer to the endpoint tier 702) may be smaller but more numerous, with fewer processing resources and lower power consumption, as compared to components that are closer to the network core (i.e., closer to the cloud/Internet tier 708). However, network communications among components closer to the network edge may be faster and/or have lower latency as compared to communications that traverse through tiers closer to the network core. The same logical gradient 710 may apply to components within a tier. For example, the access/edge tier 704 may include numerous, widely spread base stations, street cabinets, and other access nodes as well as less-numerous but more sophisticated central offices or other aggregation nodes. Thus, by including key caching functionality in the access/edge tier 704 or other components close to the network edge (e.g., logically close to the endpoint devices 104), the system 100 may improve latency and performance as compared to traditional cloud-computing based FaaS architectures.

In addition to the mobile edge computing implementation described above, it should be appreciated that the foregoing systems and methods may implemented in any environment (e.g., smart factories, smart cities, smart buildings, and the like) in which the devices are arranged and interoperate in a manner similar to that described with reference to FIG. 1, though the names of the individual devices may differ from one implementation to the next. For example, in a smart factory, the above systems and methods may improve the accuracy, efficiency, and/or safety with which one or more manufacturing operations are performed, particularly in instances in which the operations are to be performed in real time or near real time (e.g., in which low latency is of high importance). In a smart city, the above systems and methods may improve the accuracy, efficiency, and/or safety in the operation of traffic control systems, environmental monitoring systems, and/or other automated or semi-automated systems. Likewise, in a smart building, the above disclosure may applied to improve the operations of any systems that rely on sensors to collect and act upon the collected information (e.g., threat detection and evacuation management systems, video monitoring systems, elevator control systems, etc.).

It should be appreciated that, in some embodiments, the methods 300, 500 and/or 600 may be embodied as various instructions stored on a computer-readable media, which may be executed by the compute engine 120, the I/O subsystem 122, the accelerator 130, and/or other components of the edge appliance device 102 to cause the edge appliance device 102 to perform the respective method 300, 500 and/or 600. The computer-readable media may be embodied as any type of media capable of being read by the edge appliance device 102 including, but not limited to, the memory 124, the data storage device 126, firmware devices, other memory or data storage devices of the edge appliance device 102, portable media readable by a peripheral device of the edge appliance device 102, and/or other media.

EXAMPLES

Illustrative examples of the technologies disclosed herein are provided below. An embodiment of the technologies may include any one or more, and any combination of, the examples described below.

Example 1 includes a computing device for key management, the computing device comprising: a key cache, wherein the key cache is included in secure storage of the computing device; and an edge hierarchical key manager to: receive a request for a first key, wherein the request is associated with a tenant of the computing device, wherein the request is indicative of a key identifier provided by a function-as-a-service (FaaS) instance associated with an edge device; determine whether the first key is stored in the key cache in response to receipt of the request; request the first key from a remote computing device in response to a determination that the first key is not stored in the key cache, wherein the computing device and the remote computing device are included in an edge hierarchy, wherein the computing device is included in a first tier of the edge hierarchy, and wherein the remote computing device is included in a next tier of the edge hierarchy that is logically more remote from the edge device in relation to the first tier; and provide the first key as a response to the request in response to a determination that the first key is stored in the key cache or requesting of the first key.

Example 2 includes the subject matter of Examples 1, and further comprising an accelerator, wherein the accelerator comprises the edge hierarchical key manager.

Example 3 includes the subject matter of any of Examples 1 and 2, and wherein: the edge hierarchical key manager is further to (i) receive the first key from the remote computing device in response to the requesting of the first key, and (ii) store the first key in the key cache in response to receipt of the first key; and to provide the first key as the response further comprises to provide the first key in response to storage of the first key in the key cache.

Example 4 includes the subject matter of any of Examples 1-3, and wherein the edge hierarchical key manager is further to: receive a priority level associated with the tenant via a management interface of the computing device; and configure the key cache based on the priority level associated with the tenant.

Example 5 includes the subject matter of any of Examples 1-4, and wherein edge hierarchical key manager is further to request the first key from a second remote computing device in response to the determination that the first key is not stored in the key cache, wherein the second remote computing device is included in the first tier of the edge hierarchy.

Example 6 includes the subject matter of any of Examples 1-5, and wherein: to receive the request for the first key comprises to receive the request from the FaaS instance, wherein the FaaS instance is instantiated by the computing device; and to provide the first key as the response comprises to provide the first key to the FaaS instance associated with the tenant.

Example 7 includes the subject matter of any of Examples 1-6, and wherein to provide the first key to the FaaS instance comprises to provide the first key to a memory controller or a compute element of the computing device.

Example 8 includes the subject matter of any of Examples 1-7, and wherein the edge hierarchical key manager is further to: authenticate a credential of the request in response to the receipt of the request, wherein the request is indicative of the credential provided by the FaaS instance; wherein to determine whether the first key is stored in the key cache comprises to determine whether the first key is stored in the key cache in response to authentication of the credential.

Example 9 includes the subject matter of any of Examples 1-8, and wherein: to receive the request for the first key comprises to receive the request from a second remote computing device in the edge hierarchy; and to provide the first key comprises to provide the first key to the second remote computing device.

Example 10 includes the subject matter of any of Examples 1-9, and wherein the second remote computing device is included in a previous tier of the edge hierarchy, wherein the previous tier is logically less remote from the edge device in relation to the first tier.

Example 11 includes the subject matter of any of Examples 1-10, and wherein the second remote computing device is included in the first tier of the edge hierarchy.

Example 12 includes the subject matter of any of Examples 1-11, and wherein: the edge hierarchical key manager is further to: determine whether the key cache is full in response to the determination that the first key is not stored in the key cache; activate a cache management policy accelerated logic of the computing device in response to a determination that the key cache is full, wherein the cache management policy accelerated logic is associated with the tenant; and evict the first key from the key cache in response to identification of the first key; and the cache management policy accelerated logic is to identify the first key in the key cache for eviction in response to activation of the cache management policy accelerated logic.

Example 13 includes the subject matter of any of Examples 1-12, and wherein the edge hierarchical key manager is further to: receive the cache management policy accelerated logic via a management interface of the computing device; and program an accelerator with the cache management policy accelerated logic in response to receipt of the cache management policy accelerated logic.

Example 14 includes the subject matter of any of Examples 1-13, and wherein: the edge hierarchical key manager is further to activate a key prefetch accelerated logic of the computing device, wherein the key prefetch accelerated logic is associated with the tenant; the key prefetch logic is to identify the first key for pre-fetching in response to activation of the key prefetch accelerated logic; and to request the first key from a remote computing device further comprises to request the first key from the remote computing device in response to identification of the first key for pre-fetching.

Example 15 includes the subject matter of any of Examples 1-14, and wherein the edge hierarchical key manager is further to: receive the key prefetch accelerated logic via a management interface of the computing device; and program an accelerator with the key prefetch accelerated logic in response to receipt of the key prefetch accelerated logic.

Example 16 includes the subject matter of any of Examples 1-15, and wherein to identify the first key comprises to identify the first key based on telemetry information associated with the computing device.

Example 17 includes the subject matter of any of Examples 1-16, and wherein the edge hierarchical key manager is further to wait a predetermined time, wherein the predetermined time is associated with the tenant, and wherein to activate the key prefetch accelerated logic comprises to activate the key prefetch accelerated logic in response to waiting of the predetermined time.

Example 18 includes the subject matter of any of Examples 1-17, and wherein the first key comprises a user private key or a tenant private key.

Example 19 includes a method for key management, the method comprising: receiving, by a computing device, a request for a first key, wherein the request is associated with a tenant of the computing device, wherein the request is indicative of a key identifier provided by a function-as-a-service (FaaS) instance associated with an edge device; determining, by the computing device, whether the first key is stored in a key cache of the computing device, wherein the key cache is included in secure storage of the computing device; requesting, by the computing device, the first key from a remote computing device in response to determining that the first key is not stored in the key cache, wherein the computing device and the remote computing device are included in an edge hierarchy, wherein the computing device is included in a first tier of the edge hierarchy, and wherein the remote computing device is included in a next tier of the edge hierarchy that is logically more remote from the edge device in relation to the first tier; and providing, by the computing device, the first key as a response to the request in response to determining that the first key is stored in the key cache or requesting the first key.

Example 20 includes the subject matter of Example 19, and further comprising: receiving, by the computing device, the first key from the remote computing device in response to requesting the first key; and storing, by the computing device, the first key in the key cache in response to receiving the first key; wherein providing the first key as the response further comprises providing the first key in response to storing the first key in the key cache.

Example 21 includes the subject matter of any of Examples 19 and 20, and further comprising: receiving, by the computing device, a priority level associated with the tenant via a management interface of the computing device; and configuring, by the computing device, the key cache based on the priority level associated with the tenant.

Example 22 includes the subject matter of any of Examples 19-21, and further comprising requesting, by the computing device, the first key from a second remote computing device in response to determining that the first key is not stored in the key cache, wherein the second remote computing device is included in the first tier of the edge hierarchy.

Example 23 includes the subject matter of any of Examples 19-22, and wherein: receiving the request for the first key comprises receiving the request from the FaaS instance, wherein the FaaS instance is instantiated by the computing device; and providing the first key as the response comprises providing the first key to the FaaS instance associated with the tenant.

Example 24 includes the subject matter of any of Examples 19-23, and wherein providing the first key to the FaaS instance comprises providing the first key to a memory controller or a compute element of the computing device.

Example 25 includes the subject matter of any of Examples 19-24, and further comprising: authenticating, by the computing device, a credential of the request in response to receiving the request, wherein the request is indicative of the credential provided by the FaaS instance; wherein determining whether the first key is stored in the key cache comprises determining whether the first key is stored in the key cache in response to authenticating the credential.

Example 26 includes the subject matter of any of Examples 19-25, and wherein: receiving the request for the first key comprises receiving the request from a second remote computing device in the edge hierarchy; and providing the first key comprises providing the first key to the second remote computing device.

Example 27 includes the subject matter of any of Examples 19-26, and wherein the second remote computing device is included in a previous tier of the edge hierarchy, wherein the previous tier is logically less remote from the edge device in relation to the first tier.

Example 28 includes the subject matter of any of Examples 19-27, and wherein the second remote computing device is included in the first tier of the edge hierarchy.

Example 29 includes the subject matter of any of Examples 19-28, and further comprising: determining, by the computing device, whether the key cache is full in response to determining that the first key is not stored in the key cache; activating, by the computing device, a cache management policy accelerated logic of the computing device in response to determining that the key cache is full, wherein the cache management policy accelerated logic is associated with the tenant; identifying, by the cache management policy accelerated logic, a first key in the key cache for eviction in response to activating the cache management policy accelerated logic; and evicting, by the computing device, the first key from the key cache in response to identifying the first key.

Example 30 includes the subject matter of any of Examples 19-29, and further comprising: receiving, by the computing device, the cache management policy accelerated logic via a management interface of the computing device; and programming, by the computing device, an accelerator with the cache management policy accelerated logic in response to receiving the cache management policy accelerated logic.

Example 31 includes the subject matter of any of Examples 19-30, and further comprising: activating, by the computing device, a key prefetch accelerated logic of the computing device, wherein the key prefetch accelerated logic is associated with the tenant; and identifying, by the key prefetch logic, the first key for pre-fetching in response to activating the key prefetch accelerated logic; wherein requesting the first key from a remote computing device further comprises requesting the first key from the remote computing device in response to identifying the first key for pre-fetching.

Example 32 includes the subject matter of any of Examples 19-31, and further comprising: receiving, by the computing device, the key prefetch accelerated logic via a management interface of the computing device; and programming, by the computing device, an accelerator with the key prefetch accelerated logic in response to receiving the key prefetch accelerated logic.

Example 33 includes the subject matter of any of Examples 19-32, and wherein identifying the first key comprises identifying the first key based on telemetry information associated with the computing device.

Example 34 includes the subject matter of any of Examples 19-33, and further comprising waiting, by the computing device, a predetermined time, wherein the predetermined time is associated with the tenant, and wherein activating the key prefetch accelerated logic comprises activating the key prefetch accelerated logic in response to waiting the predetermined time.

Example 35 includes the subject matter of any of Examples 19-34, and wherein the first key comprises a user private key or a tenant private key.

Example 36 includes a computing device comprising: a processor; and a memory having stored therein a plurality of instructions that when executed by the processor cause the computing device to perform the method of any of Examples 19-35.

Example 37 includes one or more non-transitory, computer-readable storage media comprising a plurality of instructions stored thereon that in response to being prepared for execution and subsequently being executed result in a computing performing the method of any of Examples 19-35.

Example 38 includes a computing device comprising means for performing the method of any of Examples 19-35.

The invention claimed is:

1. A computing device for key management, the computing device comprising:
   a key cache, wherein the key cache is included in secure storage of the computing device; and
   an edge hierarchical key manager to:
      receive a first request for a first key, wherein the first request is associated with a tenant of the computing device, wherein the first request is indicative of a key identifier provided by a function-as-a-service (FaaS) instance associated with an edge device;

determine whether the first key is stored in the key cache in response to receipt of the first request;

provide a second request to obtain the first key from a remote computing device in response to a determination that the first key is not stored in the key cache, wherein the computing device and the remote computing device are included in an edge hierarchy, wherein the computing device is included in a first tier of the edge hierarchy, and wherein the remote computing device is included in a next tier of the edge hierarchy that is logically more remote from the edge device in relation to the first tier; and provide the first key as a response to the first request, the response based on (a) a determination that the first key is stored in the key cache or (b) the second request to obtain the first key from the remote computing device.

2. The computing device of claim 1, further including an accelerator, the accelerator including the edge hierarchical key manager.

3. The computing device of claim 1, wherein the edge hierarchical key manager is further to:

receive a priority level associated with the tenant via a management interface of the computing device; and configure the key cache based on the priority level associated with the tenant.

4. The computing device of claim 1, wherein the edge hierarchical key manager is further to provide a third request to obtain the first key from a second remote computing device in response to the determination that the first key is not stored in the key cache, wherein the second remote computing device is included in the first tier of the edge hierarchy.

5. The computing device of claim 1, wherein:

to receive the first request for the first key includes to receive the first request from the FaaS instance, wherein the FaaS instance is instantiated by the computing device; and to provide the first key as the response includes to provide the first key to the FaaS instance associated with the tenant.

6. The computing device of claim 5, wherein to provide the first key to the FaaS instance includes to provide the first key to a memory controller or a compute element of the computing device.

7. The computing device of claim 1, wherein:

to receive the first request for the first key includes to receive the first request from a second remote computing device in the edge hierarchy; and to provide the first key includes to provide the first key to the second remote computing device.

8. The computing device of claim 7, wherein the second remote computing device is included in a previous tier of the edge hierarchy, wherein the previous tier is logically less remote from the edge device in relation to the first tier.

9. The computing device of claim 1, wherein:

the edge hierarchical key manager is further to:

determine whether the key cache is full in response to the determination that the first key is not stored in the key cache;

activate a cache management policy accelerated logic of the computing device in response to a determination that the key cache is full, wherein the cache management policy accelerated logic is associated with the tenant; and evict the first key from the key cache in response to identification of the first key; and the cache management policy accelerated logic is to identify the first key in the key cache for eviction in response to activation of the cache management policy accelerated logic.

10. The computing device of claim 9, wherein the edge hierarchical key manager is further to:

receive the cache management policy accelerated logic via a management interface of the computing device; and program an accelerator with the cache management policy accelerated logic in response to receipt of the cache management policy accelerated logic.

11. The computing device of claim 1, wherein:

the edge hierarchical key manager is further to activate a key prefetch accelerated logic of the computing device, wherein the key prefetch accelerated logic is associated with the tenant;

the key prefetch accelerated logic is to identify the first key for pre-fetching in response to activation of the key prefetch accelerated logic; and to provide the second request to obtain the first key from the remote computing device further includes to provide the second request to obtain the first key from the remote computing device in response to identification of the first key for prefetching.

12. The computing device of claim 11, wherein the edge hierarchical key manager is further to:

receive the key prefetch accelerated logic via a management interface of the computing device; and program an accelerator with the key prefetch accelerated logic in response to receipt of the key prefetch accelerated logic.

13. The computing device of claim 11, wherein to identify the first key includes to identify the first key based on telemetry information associated with the computing device.

14. A method for key management, the method comprising:

receiving, by a computing device, a first request for a first key, wherein the first request is associated with a tenant of the computing device, wherein the first request is indicative of a key identifier provided by a function-as-a-service (FaaS) instance associated with an edge device;

determining, by the computing device, whether the first key is stored in a key cache of the computing device, wherein the key cache is included in secure storage of the computing device;

providing, by the computing device, a second request to obtain the first key from a remote computing device in response to determining that the first key is not stored in the key cache, wherein the computing device and the remote computing device are included in an edge hierarchy, wherein the computing device is included in a first tier of the edge hierarchy, and wherein the remote computing device is included in a next tier of the edge hierarchy that is logically more remote from the edge device in relation to the first tier; and providing, by the computing device, the first key as a response to the first request, the response based on (a) determining that the first key is stored in the key cache or (b) providing the second request to obtain the first key from the remote computing device.

15. The method of claim 14, further including providing, by the computing device, a third request to obtain the first key from a second remote computing device in response to determining that the first key is not stored in the key cache, wherein the second remote computing device is included in the first tier of the edge hierarchy.

16. The method of claim 14, wherein:
receiving the first request for the first key includes receiving the first request from the FaaS instance, wherein the FaaS instance is instantiated by the computing device; and
providing the first key as the response includes providing the first key to the FaaS instance associated with the tenant.

17. The method of claim 14, wherein:
receiving the first request for the first key includes receiving the first request from a second remote computing device in the edge hierarchy; and
providing the first key includes providing the first key to the second remote computing device.

18. The method of claim 14, further including:
determining, by the computing device, whether the key cache is full in response to determining that the first key is not stored in the key cache;
activating, by the computing device, a cache management policy accelerated logic of the computing device in response to determining that the key cache is full, wherein the cache management policy accelerated logic is associated with the tenant;
identifying, by the cache management policy accelerated logic, a first key in the key cache for eviction in response to activating the cache management policy accelerated logic; and
evicting, by the computing device, the first key from the key cache in response to identifying the first key.

19. The method of claim 14, further including:
activating, by the computing device, a key prefetch accelerated logic of the computing device, wherein the key prefetch accelerated logic is associated with the tenant; and
identifying, by the key prefetch accelerated logic, the first key for pre-fetching in response to activating the key prefetch accelerated logic;
wherein providing the second request to obtain the first key from the remote computing device further includes providing the second request to obtain the first key from the remote computing device in response to identifying the first key for pre-fetching.

20. One or more computer-readable storage devices comprising a plurality of instructions stored thereon that, in response to being executed, cause a computing device to at least:
receive a first request for a first key, wherein the first request is associated with a tenant of the computing device, wherein the first request is indicative of a key identifier provided by a function-as-a-service (FaaS) instance associated with an edge device;
determine whether the first key is stored in a key cache of the computing device, wherein the key cache is included in secure storage of the computing device;
provide a second request to obtain the first key from a remote computing device in response to determining that the first key is not stored in the key cache, wherein the computing device and the remote computing device are included in an edge hierarchy, wherein the computing device is included in a first tier of the edge hierarchy, and wherein the remote computing device is included in a next tier of the edge hierarchy that is logically more remote from the edge device in relation to the first tier; and
provide the first key as a response to the first request, the response based on (a) determining that the first key is stored in the key cache or (b) providing the second request to obtain the first key from the remote computing device.

21. The one or more computer-readable storage devices of claim 20, wherein the instructions are to cause the computing device to provide a third request to obtain the first key from a second remote computing device in response to determining that the first key is not stored in the key cache, wherein the second remote computing device is included in the first tier of the edge hierarchy.

22. The one or more computer-readable storage devices of claim 20, wherein:
to receive the first request for the first key includes to receive the first request from the FaaS instance, wherein the FaaS instance is instantiated by the computing device; and
to provide the first key as the response includes to provide the first key to the FaaS instance associated with the tenant.

23. The one or more computer-readable storage devices of claim 20, wherein:
to receive the first request for the first key includes to receive the first request from a second remote computing device in the edge hierarchy; and
to provide the first key includes to provide the first key to the second remote computing device.

24. The one or more computer-readable storage devices of claim 20, wherein the instructions are to cause the computing device to:
determine whether the key cache is full in response to determining that the first key is not stored in the key cache;
activate a cache management policy accelerated logic of the computing device in response to determining that the key cache is full, wherein the cache management policy accelerated logic is associated with the tenant;
identify, by the cache management policy accelerated logic, a first key in the key cache for eviction in response to activating the cache management policy accelerated logic; and
evict the first key from the key cache in response to identifying the first key.

25. The one or more computer-readable storage devices of claim 20, wherein the instructions are to cause the computing device to:
activate a key prefetch accelerated logic of the computing device, wherein the key prefetch accelerated logic is associated with the tenant; and
identify, by the key prefetch accelerated logic, the first key for pre-fetching in response to activating the key prefetch accelerated logic;
wherein to provide the second request to obtain the first key from the remote computing device further includes to provide the second request to obtain the first key from the remote computing device in response to identifying the first key for pre-fetching.

* * * * *